Oct. 4, 1938.　　　F. D. ALDRICH　　　2,131,831

DISPENSING DEVICE

Filed Feb. 11, 1938

INVENTOR.
Frank D. Aldrich.
BY Walter C. Ross
ATTORNEY.

Patented Oct. 4, 1938

2,131,831

UNITED STATES PATENT OFFICE 2,131,831

DISPENSING DEVICE

Frank D. Aldrich, Westfield, Mass.

Application February 11, 1938, Serial No. 190,019

1 Claim. (Cl. 221—104)

This invention relates to improvements in dispensing devices and is directed more particularly to novel devices for dispensing various materials in measured quantities.

One of the principal objects of the invention is the provision of a device adapted to contain a quantity of some such material as coffee, flour, or the like and dispense a measured amount of that material whenever desired. As will appear, the device is simple in form so as to be economical to manufacture and it is so arranged as to readily dispense whatever material it contains in a predetermined amount.

In general, the device of the invention includes a compartment which contains the material to be dispensed and this is provided with an outlet which leads into a movable measuring member. The arrangement is such that when the measuring member is moved to discharge the material the remainder of the contents of the device is prevented from being discharged in any way.

Various other objects and advantages of the invention will become more apparent after a reading of the following description and reference will be had to the accompanying drawing, wherein.

Figure 1:
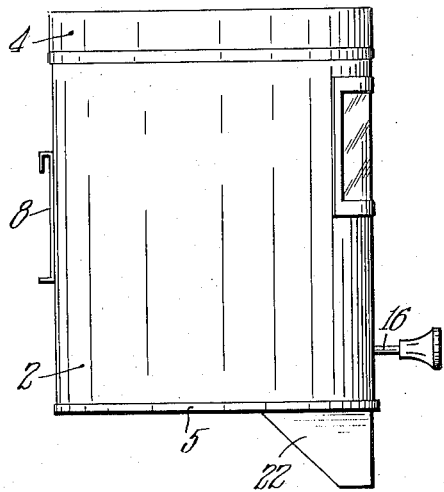
Fig. 1 is a side elevational view of a dispensing device embodying the features of the invention.
Figure 2:
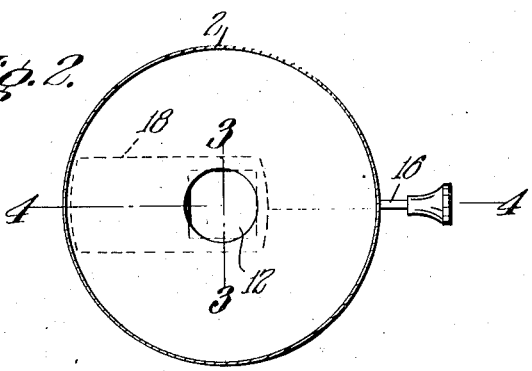
Fig. 2 is a sectional plan view of the device shown in Fig. 1 with dot-dash lines to explain certain features of construction.

Referring now to the drawing more in detail, the invention will be fully described.

A receptacle 2 is provided and this may vary in shape or form. For purposes of description it is shown as a cylinder having a lower wall 5 closing its lower end and having an open upper side. There may be a cover 4 removably disposed over said upper side.

There may be a window 6 in a side of the container and this is so that one may ascertain the amount of material therein without removing the cover. Also, there is preferably a bracket 8 associated with the rear side of the receptacle for facilitating the attaching of the same to a wall or the like.

Within the receptacle 2 there is a compartment forming member 10 which may be of any shape and form but preferably is more or less cone-shaped as shown. This is secured within the receptacle at a point above the bottom thereof to form upper and lower compartments.

The member 10 is provided with a central opening 12 which forms an outlet from the upper compartment. The outlet 12 may be of any shape but is preferably circular as shown.

The upper compartment is adapted to contain the material which is to be dispensed while the lower compartment contains the measuring means now to be described.

Figure 3:
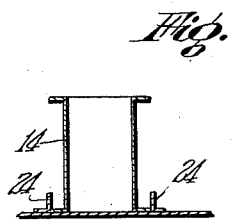
Fig. 3 is a sectional view on the line 3—3 of Fig. 2.

A tubular member 14 is provided and it may be square as shown or circular or otherwise. It is preferably formed of bent metal, and its upper and lower sides are flanged as shown in Fig. 3.

Figure 4:
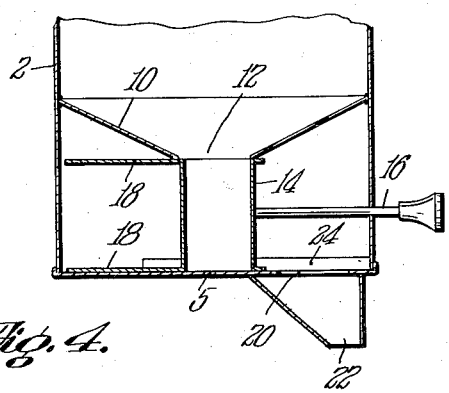
Fig. 4 is a sectional view on the line 4—4 of Fig. 2.

The tubular member normally underlies the outlet 12 as shown in Fig. 4 and is thus adapted to receive a measured quantity of material from the upper compartment. A manually engageable member 16 is secured to part 14 whereby the same may be moved from its normal position to a position forwardly of the outlet.

The lower wall 5 of the receptacle is provided with a discharge opening 20 in its forward side and there may be a discharge spout 22 associated therewith. The arrangement is such that as the tube 14 is moved forwardly by the manually engageable member, it is caused to coincide with the discharge opening 20 whereupon the material within the tube falls therethrough and out spout 22 by gravity.

As stated, the upper and lower sides of the tube may be bent over so that flanges extend radially and beyond the peripheries of both outlet 12 and opening 20. Further, I provide a rearwardly extending keeper or plate member 18 on the upper side of the tube and this is of sufficient size and is so arranged that it underlies and closes off the outlet 12 when the tube 14 is moved to its forward discharge position. Thus material in the upper compartment is prevented from falling into the lower compartment except when the measuring tube is in coincidence with the outlet 12 and in position to receive the material.

Preferably there is also a similar rearwardly extending plate 18 on the bottom of the tube. This serves to balance the tube and also acts as a guide as will now appear.

Spaced guides 24 are provided on the lower wall 5 and the tube 14 is arranged to slide therebetween as shown in Fig. 3. That is, the flanges on the tube 14 and the lower keeper 18 may engage the guides 24 and in this way ready and accurate movement of the measuring device is facilitated.

While I have described the invention in great detail and with respect to a preferred form thereof, it is not desired to be limited thereto since many changes and modifications may be made therein without departing from the spirit and scope of the invention.

What it is desired to claim and secure by Letters Patent of the United States is:

A dispensing device comprising in combination, a receptacle having vertical side walls and a horizontal lower wall, the latter being provided with a downwardly directed opening adjacent a side thereof, a wall member spaced above the said lower wall and extending between said side walls, said wall member being provided with a substantially central opening and cooperating with the said side and lower walls to provide an upper compartment and a lower compartment, a vertically disposed tube member wholly confined within the said lower compartment and slidable between a position underlying said opening in the said wall member and a position overlying said opening in the said lower wall, the sliding movements of said tube member being limited by said side walls, the upper and the lower peripheral edges of said tube being bent outwardly in a horizontal plane radially of the said tube, the rear portion of the said upper and lower bent-over edges being extended rearwardly a substantial distance, spaced guides extending upwardly from said lower wall and receiving therebetween the said lower bent-over edges of the said tube member as well as the lower extension whereby the said vertical tube is guided for its sliding movements between said positions.

FRANK D. ALDRICH.